United States Patent

Wirobski

Patent Number: 6,136,871
Date of Patent: Oct. 24, 2000

[54] PROCESS FOR THE PREPARATION OF POLYOLEFINIC PARTICLE FOAM

[75] Inventor: Reinhard Wirobski, Marl, Germany

[73] Assignee: Huels Aktiengesellschaft, Marl, Germany

[21] Appl. No.: 09/126,078

[22] Filed: Jul. 30, 1998

Related U.S. Application Data

[62] Division of application No. 08/746,812, Nov. 18, 1996, abandoned.

[30] Foreign Application Priority Data

Nov. 16, 1995 [DE] Germany .......................... 195 42 734

[51] Int. Cl.⁷ .................................. C08J 9/20; C08J 9/22
[52] U.S. Cl. ................................. 521/60; 521/56; 521/143
[58] Field of Search ............................. 521/60, 56, 143

[56] References Cited

U.S. PATENT DOCUMENTS

| | | |
|---|---|---|
| 3,632,288 | 1/1972 | Niechwiadowicz et al. . |
| 4,166,161 | 8/1979 | Noetzel ..................................... 521/96 |
| 4,379,859 | 4/1983 | Hirosawa et al. . |
| 4,399,087 | 8/1983 | Akiyama et al. . |
| 4,440,703 | 4/1984 | Akiyama et al. . |
| 4,448,901 | 5/1984 | Senda et al. . |
| 4,692,507 | 9/1987 | Akiyama et al. . |
| 4,695,593 | 9/1987 | Kuwabara et al. . |
| 4,855,327 | 8/1989 | Fukui ....................................... 521/58 |
| 5,032,620 | 7/1991 | Arai et al. . |
| 5,380,766 | 1/1995 | Träger et al. . |
| 5,480,599 | 1/1996 | Leven et al. . |
| 5,550,170 | 8/1996 | Träger et al. . |
| 5,605,937 | 2/1997 | Knaus . |
| 5,618,478 | 4/1997 | Wirobski et al. . |

FOREIGN PATENT DOCUMENTS

| | | |
|---|---|---|
| 0 095 109 | 11/1983 | European Pat. Off. . |
| 0 323 719 | 7/1989 | European Pat. Off. . |
| 0 377 186 | 7/1990 | European Pat. Off. . |

*Primary Examiner*—Morton Foelak
*Attorney, Agent, or Firm*—Oblon, Spivak, McClelland, Maier & Neustadt, P.C.

[57] ABSTRACT

Polyolefinic particle foams containing additives may be produced by a process, which comprises (a) initially charging a pressure-resistant reactor with a dispersion consisting essentially of polyolefin particles and a liquid dispersion medium, and also a mixture of a volatile organic blowing agent and the additive to be introduced;

(b) carrying out a heat treatment in which the polyolefin particles are impregnated with the mixture; and subsequently (c) discharging the dispersion through an orifice into a low-pressure space, thus foaming the polymer particles.

The process achieves efficient incorporation of the additives into the polyolefin particles. The particle foams thus-obtained are useful for the production of moldings.

12 Claims, No Drawings

PROCESS FOR THE PREPARATION OF POLYOLEFINIC PARTICLE FOAM

This application is a Division of application Ser. No. 08/746,812, filed on Nov. 18, 1996, now abandoned.

BACKGROUND OF THE INVENTION

1. Field of the Invention

The present invention relates to polyolefinic foam particles which have been provided with additives during their production in a dispersion process, and a process for their production as well as moldings produced from such foam particles.

2. Discussion of the Background

The production of polyolefinic particle foams by the dispersion process is conventional and is described in many patent applications, for example EP-A-0 053 333 and EP-A-0 095 109. Particle foams produced in this way can be processed into moldings by known methods.

Owing to their property profile, polyolefinic particle foams or the moldings produced therefrom have many applications. However, for certain fields of application, the properties of the particle foam have to be modified. For example, flame retardant treatment is frequently demanded in the building sector, while the electrical industry often requires an antistatic treatment. In other cases, the market desires a colored product.

Processes for the treatment of particle foams are known. In these processes, the particle foam is customarily provided with the desired treatment by subsequent coating (DE-A 42 35 693). However, this generally represents an additional processing step for the processor. In addition, it is frequently observed that the active component is rubbed off the molding, and the cooling water may be contaminated during processing. In addition, intensive steaming is required for good welding of the foam beads.

Thus, there remains a need for polyolefinic particle foams which are free of such drawbacks. There also remains a need for a process for preparing such polyolefinic foams which is free of the above-mentioned drawbacks.

SUMMARY OF THE INVENTION

Accordingly, it is one object of the present invention to provide novel polyolefinic particle foams.

It is another object of the present invention to provide novel polyolefinic particle foams which contain an additive.

It is another object of the present invention to provide novel polyolefinic particle foams which contain an additive and which exhibit a reduced tendency toward additive loss by rubbing off during molding.

It is another object of the present invention to provide novel polyolefinic particle foams which contain an additive and which exhibit a reduced tendency to contaminate cooling water during processing.

It is another object of the present invention to provide a novel method for preparing such polyolefinic particle foams.

It is another object of the present invention to provide novel molded articles prepared from such polyolefinic particle foams.

These and other objects, which will become apparent during the following detailed description, have been achieved by the inventor's discovery that such polyolefinic particle foams may be obtained by a process for the treatment of particle foam which comprises a) initially charging a pressure-resistant reactor with a dispersion consisting essentially of polyolefin particles and a liquid dispersion medium, and also a mixture of a volatile organic blowing agent and the additive to be introduced, b) carrying out a heat treatment in which the polyolefin particles are impregnated with the mixture, and subsequently c) discharging the dispersion through an orifice into a low-pressure space, thus foaming the polymer particles.

DETAILED DESCRIPTION OF THE PREFERRED EMBODIMENTS

Suitable polyolefins are, for example, propylene polymers such as propylene-ethylene or propylene-butylene random copolymers, random terpolymers of ethylene, propylene and 1-butene, ethylene-propylene block copolymers and homopolypropylene, ethylene polymers such as polyethylene of low, intermediate, or high density, linear low density polyethylene, ethylene-vinyl acetate copolymers, ethylene-methyl methacrylate copolymers, ionomers or other polyolefins such as poly-1-butene. Preference is given to using an ethylene-propylene random copolymer containing from 1 to 15% by weight of ethylene.

These polymers are in the form of discrete particles, for example as granules. They preferably have a mean particle diameter of from 0.5 to 5 mm. In order to achieve uniform foaming, they can, if desired, corresponding to the prior art, contain a filler which acts as nucleating agent.

The dispersion medium used is preferably water. However, for example, alcohols such as methanol or ethanol are also suitable.

To prevent agglomeration, a finely divided dispersant and/or a surface-active compound can be added to the mixture of polymer particles and dispersion medium. Examples of such auxiliaries are calcium phosphate, basic magnesium carbonate, basic zinc carbonate, calcium carbonate, aluminum oxide, barium sulfate, talc, alkylbenzenesulfonates, paraffinsulfonates or ethoxylates.

Suitable organic blowing agents are known from the prior art; for example, it is possible to use saturated aliphatic hydrocarbons such as ethane, propane, n-butane, i-butane, pentane or hexane, alicyclic hydrocarbons such as cyclopentane or cyclohexane, halogenated hydrocarbons such as trichloromonofluoromethane, dichlorodifluoromethane, dichlorotetrafluoroethane, trichlorotrifluoroethane, dichloromonofluoromethane, methyl chloride, methylene chloride or ethyl chloride, in each case individually or as a mixture.

The additive to be introduced is preferably a flame retardant, an antistatic agent and/or a dye.

Suitable flame retardants are known and are described, for example, in Gächter/Müller, Taschenbuch der Kunststoff-Additive, 3rd edition, Carl Hanser Verlag, Munich 1989, page 749 ff. In accordance with the prior art, the effect can be reinforced by addition of a synergist.

Suitable antistatic agents are likewise known; they are described, for example, in the above-mentioned handbook by Gächter/Müller on pages 798 ff.

Suitable dyes are those which are soluble in the volatile organic blowing agent. For example, it is possible to use the dyes which are described in the above-mentioned handbook by Gächter/Müller on pages 679 ff.

Foaming can be carried out by any process of the prior art, in particular, EP-A-0 053 333, EP-A-0 095 109, EP-A-0 630

935 and EP-A-0 646 619, which are expressly incorporated herein by reference.

In the impregnation of the softened polyolefin particles with an organic blowing agent, the additives dissolved in the blowing agent are "pulled into" the polyolefin matrix. The penetration depth of the additives is dependent on the degree of softening of the polyolefin and impregnation time. However, under the conditions which are conventional in particle foam production by the dispersion process, efficient incorporation of the additives into the polyolefin matrix is achieved.

The heat treatment is generally carried out in the temperature range between $T_m-30°$ and $T_m+10°$ C. (where $T_m$ is the melting point of the polyolefinic particle) over a period of from 5 minutes to 2 hours, preferably from 15 to 60 minutes.

The weight ratio of liquid medium to polyolefinic particles is known from the prior art.

The amount of the additive mixed with the blowing will depend on the exact nature of the additive and is easily determined by the skilled artisan.

The dispersion is subsequently discharged through an orifice into a low-pressure space. The orifice can have any geometry known from the prior art. The pressure in the low-pressure space is generally in the vicinity of atmospheric pressure.

The foamed polymer particles are subsequently separated and dried in a conventional manner. They can be processed into moldings using known methods. In the machines used for this purpose, the polymer foam is softened and partially melted under pressure with the aid of steam at, for example, from 1 to 5 bar, with the individual foam particles welding together to give a molding.

Other features of the invention will become apparent in the course of the following descriptions of exemplary embodiments which are given for illustration of the invention and are not intended to be limiting thereof.

EXAMPLES

The amounts indicated in the following Examples are in each case parts by weight.

General Experimental Procedure:
In a 40 1 reactor, a suspension comprising
100 parts of water,
15 parts of an ethylene-propylene random copolymer having
$T_m=143°$ C.,
7.6 parts of n-butane,
0.3 part of MARLOWET® R 40,
0.01 part of MARLON® A 360
and also the additive specified in the examples is heated while stirring to 130° C. and is stirred for 30 minutes at this temperature. After this hold time has expired, the reactor pressure is increased to 28 bar using nitrogen and the contents are discharged via a nozzle into a low-pressure space, thus foaming the polymer particles. The bulk density is 24 g/l.

The foamed particles are dried and subsequently processed into moldings by the compression molding process using an automatic molding machine. Test specimens are taken from the moldings for determination of the properties in question.

Comparative Example 1

Test specimens from moldings of the particle foam produced without additive do not meet the requirements of DIN 4102 B2 ("normally flammable"). In addition, a surface resistance of from $10^{13}$ to $10^{15}$ ohm is measured in accordance with DIN 53 486.

Example 1

The procedure of Comparative Example 1 is repeated with the sole difference that a flame-retardant system is added to the blowing agent (1.6% by weight of dicumyl peroxide as synergist and 2.0% by weight of hexabromocyclododecane, in each case with regard to the copolymer). Processing of the particle foam obtained gives moldings which meet the requirements of DIN 4102 B2.

Example 2

The procedure of Comparative Example 1 is repeated with the sole difference that 3.5% by weight, with regard to the copolymer, of fatty acid ester as antistatic agent are added to the blowing age Processing gives moldings which have a surface resistance in accordance with DIN 53 486 of from about $10^8$ to $10^{10}$ ohm.

Example 3

The procedure of Comparative Example 1 is repeated with the sole difference that a water-insoluble organic dye is added to the blowing agent (2.0% by weight, with regard to the copolymer, of anthraquinone dye (Macrolex Rot GS) ). Processing of the particle foam gives well colored moldings.

Corresponding results are also achieved using Macrolex Schwarz.

This application is based on German Patent Application 195 42 734.3 filed on Nov. 16, 1995, which is incorporated herein by reference in its entirety.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A process for the preparation of foamed particles of a polyolefin polymer, which comprises
    (a) charging a pressure-resistant reactor with a dispersion consisting essentially of polyolefin particles, a liquid dispersion medium, and a mixture of a volatile organic blowing agent and an additive;
    (b) heating the dispersion such that the polyolefin particles are impregnated with said mixture of volatile blowing agent and additive, said additive being dissolved in said blowing agent and being thereby incorporated into said particles; and subsequently,
    (c) discharging the dispersion through an orifice into a low-pressure space, to effect foaming of the polyolefin particles.

2. The process of claim 1, wherein said additive is selected from the group consisting of flame retardants, antistatic agents, and dyes.

3. The process of claim 1, wherein said polyolefin is an ethylene-propylene random copolymer containing from 1 to 15% by weight of ethylene.

4. The process of claim 1, wherein said blowing agent is selected from the group consisting of ethane, propane, n-butane, i-butane, pentane, hexane, cyclopentane, cyclohexane, trichloromonofluoromethane, dichlorodifluoromethane, dichlorotetrafluoroethane, trichlorotrifluoroethane, dichloromonofluoromethane, methyl chloride, methylene chloride, and ethyl chloride.

5. The process of claim 1, wherein said dispersion further consists essentially of a finely divided dispersant and/or a surface-active compound selected from the group consisting of calcium phosphate, basic magnesium carbonate, basic zinc carbonate, calcium carbonate, aluminum oxide, barium sulfate, talc, alkyl benzenesulfonates, alkyl paraffinsulfonates, and ethoxylates.

6. The process of claim 1, wherein said polyolefin particles have a mean particle diameter of 0.5 to 5 mm.

7. The process of claim 1, wherein said heating is carried out at a temperature of $T_m-30$ to $T_m+10°$ C., wherein $T_m$ is the melting point of said polyolefin particle.

8. The process of claim 1, wherein the additive is a flame retardant.

9. The process of claim 1, wherein the additive is an antistatic agent.

10. The process of claim 1, wherein the additive is a dye.

11. The process of claim 1, wherein the additive penetrates into said particles to a depth dependent on the degree of softening of the polyolefin and the impregnation time.

12. The process of claim 1, wherein the additive is a combination of hexabromocyclododecane and dicumyl peroxide.

\* \* \* \* \*